(12) United States Patent
Kikuchi et al.

(10) Patent No.: US 8,514,320 B2
(45) Date of Patent: Aug. 20, 2013

(54) ELECTRONIC CAMERA AND FOCUS CONTROL METHOD WHICH MINIMIZES THE TIME REQUIRED FOR ADJUSTING A FOCUS

(75) Inventors: Kenichi Kikuchi, Hyogo (JP); Kazuhiko Sugimoto, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 12/800,217

(22) Filed: May 11, 2010

(65) Prior Publication Data

US 2010/0253831 A1    Oct. 7, 2010

Related U.S. Application Data

(63) Continuation of application No. 10/333,701, filed as application No. PCT/JP01/06469 on Jul. 26, 2001, now Pat. No. 7,733,410.

(30) Foreign Application Priority Data

Jul. 31, 2000   (JP) .................................. 2000-232196

(51) Int. Cl.
*G03B 13/00*   (2006.01)
*H04N 5/232*   (2006.01)

(52) U.S. Cl.
USPC .................. 348/345; 348/208.11; 348/208.12; 348/346; 348/211.9; 348/349; 348/354

(58) Field of Classification Search
USPC ............ 348/208.11, 208.12, 345, 346, 211.9, 348/349, 354, 355, 356
See application file for complete search history.

(56) References Cited

U.S. PATENT DOCUMENTS

| 4,484,806 | A | 11/1984 | Onishi et al. .................. 354/404 |
| 4,617,459 | A | 10/1986 | Akashi et al. .................. 250/201 |
| 4,967,280 | A | 10/1990 | Takuma et al. ............... 358/227 |

(Continued)

FOREIGN PATENT DOCUMENTS

| EP | 0341695 | 11/1989 |
| JP | 57-197524 | 12/1982 |

(Continued)

OTHER PUBLICATIONS

International Search Report for PCT application serial No. PCT/JP01/06469.

(Continued)

*Primary Examiner* — Usman Khan
(74) *Attorney, Agent, or Firm* — Gerald T. Bodner (57) ABSTRACT

An electronic camera includes a shutter button. When the shutter button is half-depressed, a focal level of an object is determined on the basis of an image signal outputted from an imaging device, and a moving start position of a focus lens is settled on the basis of the determination result. More specifically, a correction amount of the moving start position is settled in accordance with the determination result of the focal level, and a position that subtracts the correction amount from a lens position at a time the shutter button being half-depressed is settled as the moving start position. The higher the focal level, the more reduced the correction amount. The focus lens gradually moves toward the imaging device from the settled moving start position, and a focal position is specified on the basis of the image signal outputted from the imaging device at each step.

4 Claims, 11 Drawing Sheets

(56) References Cited

U.S. PATENT DOCUMENTS

| | | | |
|---|---|---|---|
| 4,980,773 A | 12/1990 | Suda et al. | 348/227 |
| 5,003,339 A | 3/1991 | Kikuchi et al. | 354/402 |
| 5,146,071 A | 9/1992 | Ookubo et al. | 250/201.2 |
| 5,448,295 A * | 9/1995 | Hirota | 348/345 |
| 5,526,049 A | 6/1996 | Lee | 348/354 |
| 5,614,951 A | 3/1997 | Lee et al. | 348/356 |
| 5,819,120 A | 10/1998 | Hamada et al. | 396/77 |
| 6,396,540 B1 | 5/2002 | Ohkawara | 348/345 |
| 6,507,367 B2 | 1/2003 | Yasuda | 348/355 |
| 6,614,480 B1 * | 9/2003 | Oda et al. | 348/351 |
| 6,704,054 B1 * | 3/2004 | Hashimoto | 348/354 |
| 6,714,731 B2 | 3/2004 | Ogg et al. | 396/81 |
| 6,727,949 B1 | 4/2004 | Saruwatari et al. | 348/349 |
| 6,785,470 B2 * | 8/2004 | Ichimasa | 396/206 |
| 6,943,839 B1 | 9/2005 | Matsumoto et al. | 348/333.01 |
| 2003/0063322 A1 * | 4/2003 | Itoh et al. | 358/302 |

FOREIGN PATENT DOCUMENTS

| | | |
|---|---|---|
| JP | 59-102204 | 6/1984 |
| JP | 03-068280 | 3/1991 |
| JP | 05-088068 | 4/1993 |
| JP | 05-308557 | 11/1993 |
| JP | 09-133854 | 5/1997 |
| JP | 10-048511 | 2/1998 |
| JP | 10-48512 | 2/1998 |
| JP | 2000-105332 | 4/2000 |
| JP | 2000-147368 | 5/2000 |
| JP | 2001-255457 | 9/2001 |

OTHER PUBLICATIONS

International Preliminary Examination Report.

* cited by examiner

ELECTRONIC CAMERA AND FOCUS CONTROL METHOD WHICH MINIMIZES THE TIME REQUIRED FOR ADJUSTING A FOCUS

CROSS-REFERENCE TO RELATED APPLICATIONS

This application is a continuation of co-pending U.S. application Ser. No. 10/333,701, filed on Sep. 22, 2003, and entitled, "Electronic Camera and Focus Control Method", the disclosure of which is incorporated herein by reference.

TECHNICAL FIELD

The present invention relates to an electronic camera and a focus control method. More specifically, the present invention relates to an electronic camera and a focus control method thereof that adjusts a distance, which is from a focus lens to an image sensor.

PRIOR ART

In a conventional electronic camera such as a video camera, a digital still camera, or the like, a focus is controlled on the basis of a high-frequency component of an image signal outputted from an imaging device (image sensor), taking advantage of a characteristic that the more exact the focus being brought to an object, the higher a contrast of an image of the object.

Such the focus control method has a number of excellent advantages such as (1) no parallax in essence, (2) possible to focus a camera exactly even when a depth of field is shallow or the object is present in a far distance. In addition, this method does not need to prepare a special sensor for focus control extra, and is quite easy mechanically.

One example of an autofocus camera adopting the above-described focus control method is disclosed in Japanese Patent laying-open No. 3-68280 [H04N5/232] laid-open on Mar. 25, 1991. The prior art is described using an electronic still camera that fetches a still image of an object, and a focus lens moves by each predetermined step from an infinite far side terminal (wide side terminal) of an object distance to a near-side terminal (tele-side terminal). A high-frequency component is extracted from an image signal photographed in each step, and a position at which an integral value of the extracted high-frequency component, i.e., a focus evaluation value becomes a maximum is detected as a focal point.

However, if a so-called one shot autofocus control, in which the focus control is performed in response to a key operation for fetching the still image of the object, is adopted to the prior art, it may take time to perform the focus control when photographing a plurality of objects having the focal points adjacent to one another. That is, a detection of the focus evaluation value is always started from the infinite far side so that it takes time to detect the focal point in a case that a focus of each object is adjusted at the near side.

SUMMARY OF THE INVENTION

Therefore, it is a primary object of the present invention to provide a novel electronic camera.

It is another object of the present invention to provide a novel focus control method.

It is still another object of the present invention to provide an electronic camera capable of shortening a required time for detecting a focal point.

It is yet still another object of the present invention to provide a focus control method capable of shortening a required time for detecting the focal point.

The present invention is an electronic camera that adjusts a distance from a focus lens to an imaging device, and comprises: a determining means for determining a focal level on the basis of an image signal outputted from the imaging device when a distance adjusting instruction is applied; a settling means for settling an initial value of the distance on the basis of a determination result of the determining means; a reducing means for gradually reducing the distance using said initial value as a reference; and an optimum value setting means for setting the distance to an optimum value on the basis of the image signal outputted from the imaging device in each step shortened by the reducing means.

When the distance adjusting instruction is applied, the focal level is determined on the basis of the image signal outputted from the imaging device, and the initial value of the distance from the focus lens to the imaging device is settled on the basis of the determination result. The distance from the focus lens to the imaging device is gradually shortened using the settled initial value as a reference, and set to an optimum value on the basis of the image signal outputted from the imaging device in each step.

In settling the initial value of the distance from the focus lens to the imaging device, the focal level at a time that the distance adjusting instruction is applied is reflected. That is, the initial value of the distance differs depending upon the focal level of the object at a time that a distance adjustment is started. Therefore, this makes it possible to detect the focal level in a shorter time than the prior art, in which the distance adjustment is always started from the same position.

In a preferred embodiment, a correction amount of the distance is settled in accordance with the determination result of the focal level, and a subtracted value that subtracts the correction amount from the distance at a time that the distance adjustment instruction is applied is settled as an initial value. It is noted that the correction amount is better reduced in proportion to an increase of the focal level.

In a case that a high-frequency component of the image signal is detected, and an integral value is evaluated by integrating the high-frequency component, the focal level may be determined by comparing the integral value with a threshold value.

In a case that a first integral value is evaluated by integrating a first high-frequency component of the image signal, and a second integral value is evaluated by integrating a second high-frequency component of the image signal, the focal level may be determined on the basis of a ratio of the first integral value and the second integral value. In addition, the focal level may be determined on the basis of at least one of the first integral value and the second integral value, and the ratio.

It is noted that the first high-frequency component is preferably a component extracted from a first high-frequency bandwidth, and the second high-frequency component is a component extracted from a frequency bandwidth, which is on a lower bandwidth side than the first frequency bandwidth, and the first high-frequency bandwidth.

According to the present invention, a focus control method of an electronic camera that adjusts a distance from a focus lens to an imaging device comprises steps of: (a) determining a focal level on the basis of an image signal outputted from the imaging device when a distance adjusting instruction is applied; (b) settling an initial value of the distance on the basis of a determination result obtained in the step (a); (c) gradually reducing the distance using said initial value as a reference;

and (d) setting the distance to an optimum value on the basis of the image signal outputted from the imaging device in each step shortened by the step (c).

When the distance adjusting instruction is applied, the focal level is determined on the basis of the image signal outputted from the imaging device, and the initial value of the distance from the focus lens to the imaging device is settled on the basis of the determination result. The distance from the focus lens to the imaging device is gradually shortened using the settled initial value as a reference, and set to the optimum value on the basis of the image signal outputted from the imaging device in each step. Therefore, it is possible to detect the focal position in a shorter time than the prior art, in which the distance adjustment is always started from the same position.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
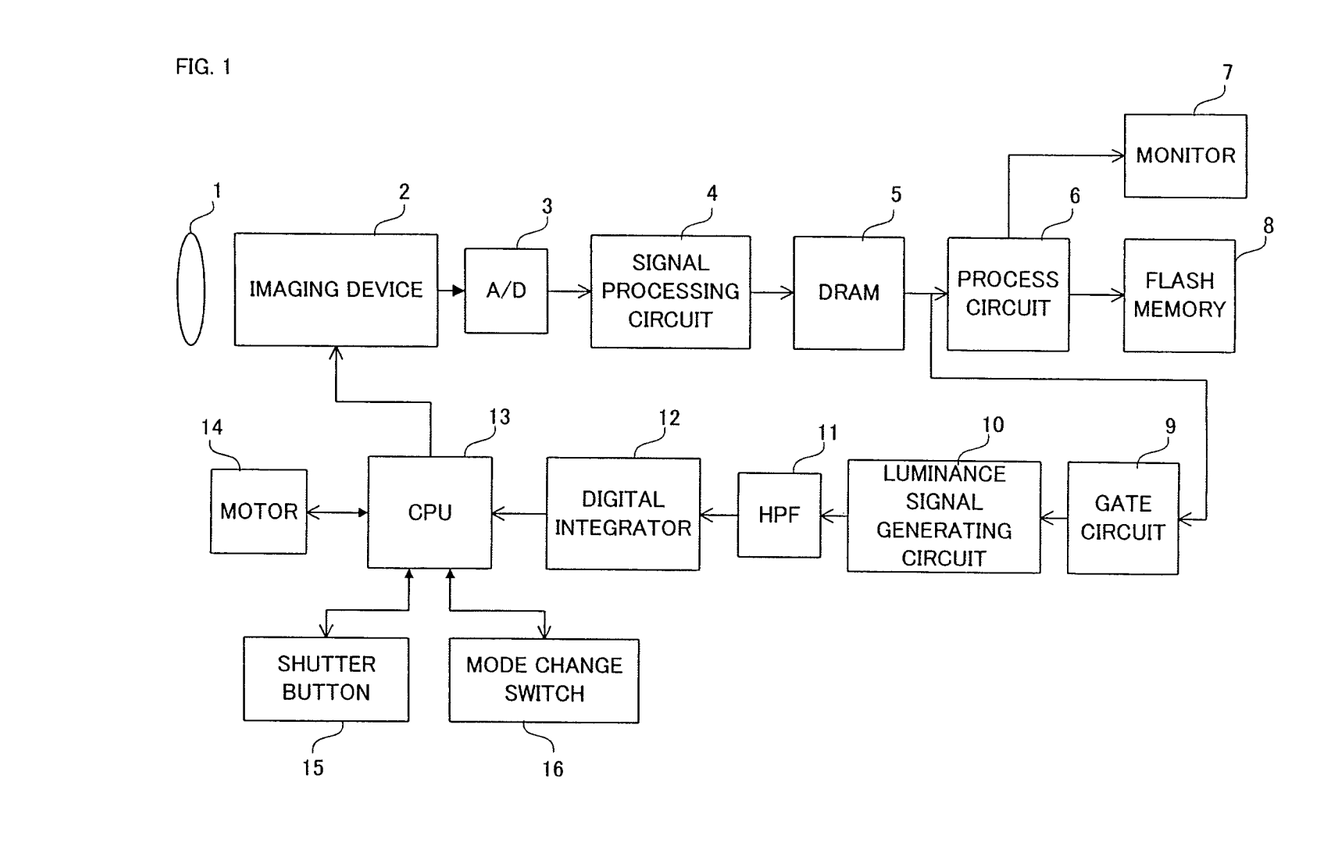
FIG. 1 is a block diagram showing one embodiment of the present invention.

Referring to FIG. 1, an electronic camera of this embodiment includes a focus lens 1. An optical image of an object is incident upon a light-receiving surface of an imaging device (image sensor) 2 via the focus lens 1. On the light-receiving surface, a raw image signal corresponding to the optical image is generated by photoelectronic conversion.

If a camera mode is selected by a mode change switch 16, a CPU 13 instructs the imaging device 2 to output the raw image signal. The raw image signal converted photoelectronically on the light-receiving surface is outputted from the imaging device 2 by each 1 field. The outputted raw image signal of each field is converted into a digital signal by an A/D converter 3 before being applied to a signal processing circuit 4.

The signal processing circuit 4 applies a well-known automatic exposure correction and an automatic white balance correction to the applied raw image signal. The exposure, in addition to applying a gain to the raw image signal in the signal processing circuit 4, is adjusted also by an aperture mechanism not shown, however, detailed descriptions are omitted.

A DRAM 5 sequentially stores the raw image signal outputted from the signal processing circuit 4 by each 1 field, and applies the stored raw image signal of each field to a processing circuit 6. The processing circuit 6 subjects the raw image signal of each field read from the DRAM 5 to signal processings such as a well-known color separation, and others so as to generate a composite image signal, and applies to generated composite image signal to a monitor 7. A real time moving image (through image) of the object is displayed on the monitor 7.

The raw image signal of each field read from the DRAM 5 is also applied to a gate circuit 9. A focus area is formed in a center of a screen, and the gate circuit 9 extracts the raw image signal within the focus area. A luminance signal generating circuit 10 generates a luminance signal on the basis of the extracted raw image signal. An HPF 11 extracts a high-frequency component from a generated luminance signal. The extracted high-frequency component is integrated by a digital integrator 12 by each 1 field period. The integral value calculated by each 1 field period is applied to the CPU 13 as a focus evaluation value of the raw image signal of each field.

If a shutter button 15 is half-depressed, the CPU 13 drives a focus motor (stepping motor) 14 in accordance with an autofocus program described later. This causes the focus lens 1 to gradually move in an optical axis direction, whereby a distance from the focus lens 1 to the imaging device 2 is changed.

If the shutter button 15 is fully depressed after the focus lens 1 is set to a focal position, the CPU 13 instructs the imaging device 2 to perform a primary exposure. The primary exposure is performed in the imaging device 2, and the raw image signal generated thereby is outputted from the imaging device 2. The imaging device 2 is rendered deactivated thereafter. The raw image signal based on the primary exposure is applied to the processing circuit 6 via the A/D converter 3, the signal processing circuit 4, and the DRAM 5. On the basis of the applied raw image signal, the signal processing circuit 6 generates an image signal in a YUV format, subjects the generated image signal to a compression process, and stores the compressed image signal into a flash memory 8.

It is noted that the compressed image signal is read out from the flash memory 8 when a reproduction mode is selected by the mode change switch 16, and converted into a composite image signal by the processing circuit 6. The converted composite image signal is applied to the monitor 7, thereby displaying a reproduced image.

More specifically, the CPU 13 carries out flowcharts shown in FIG. 2-FIG. 5. Firstly, the imaging device 2 is activated in a step S1 in FIG. 2, and it is determined whether or not a vertical synchronization signal is generated in a step S3. The vertical synchronization signal is generated at a start of each field, and if YES is determined in the step S3, an exposure control, a white balance control, and a fetching of the focus evaluation value are carried out in steps of S5, S7, and S9, respectively. The focus evaluation value fetched in the step S9 is retained as a variable data. It is determined whether or not the shutter button 15 is half-depressed in a step S11, and if NO is determined, the process returns to the step S3. Therefore, unless the shutter button 15 is operated, the processes of steps S5-S9 are executed by each 1 field period. A through image is displayed on the monitor 7, and the focus evaluation value based on the exposure, which is 2 fields before, is outputted from the digital integrator 12. The variable data is updated by each 1 field.

Figure 2:
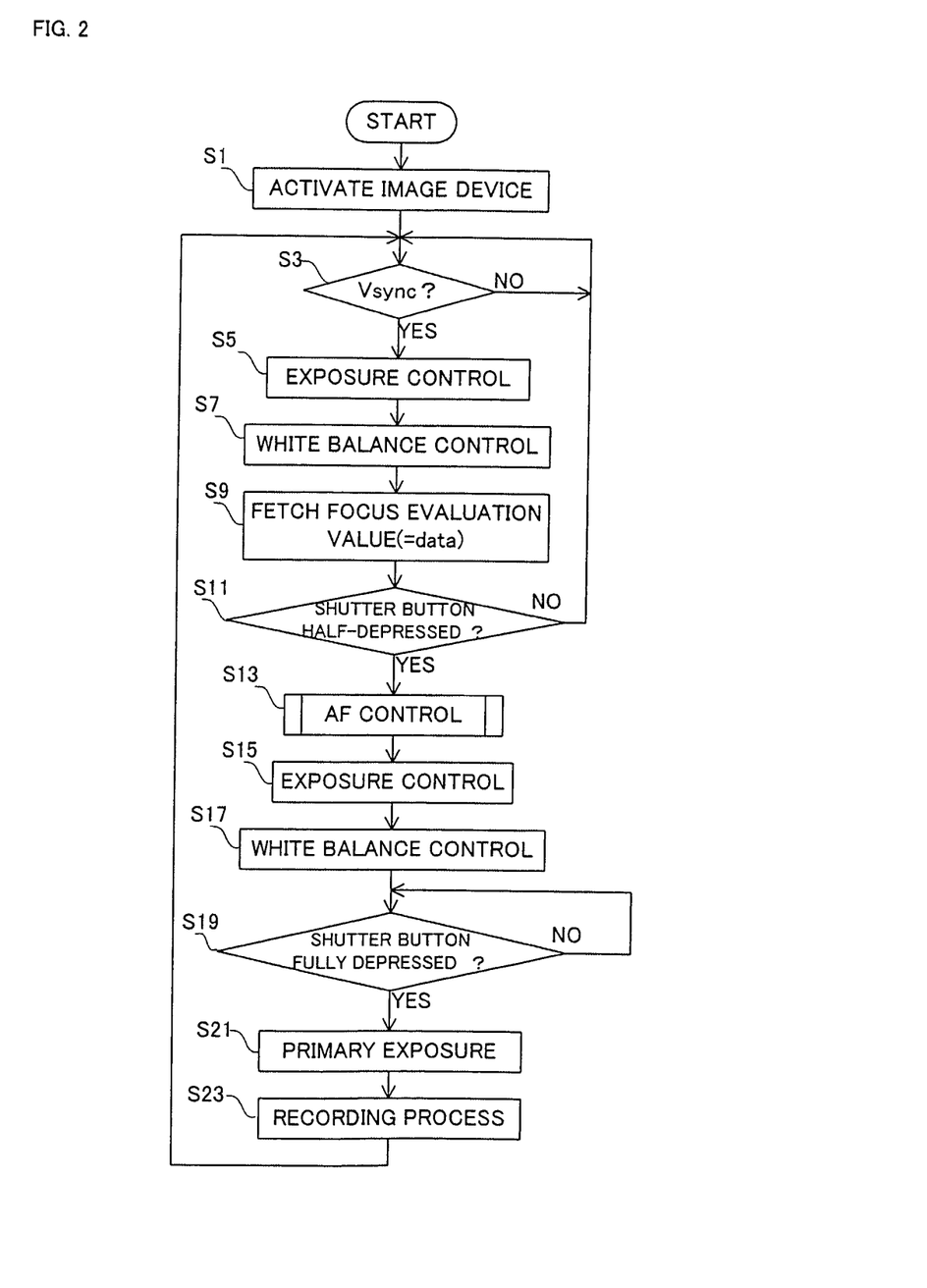
FIG. 2 is a flowchart showing one portion of an operation of the FIG. 1 embodiment.

If the shutter button 15 is half-depressed, the process advances from the step S11 to a step S13 so as to perform an AF control. Upon completion of the AF control, the exposure control and the white balance control are carried out in steps of S15 and S17, respectively, and it is determined whether or not the shutter button 15 is fully depressed in a step S19. If the shutter button 15 is fully depressed, the primary exposure is carried out in a step S21, and a recording process of the image signal based on the primary exposure is carried out in a step S23. The raw image signal generated by the primary exposure is applied to the processing circuit 6 via the A/D converter 3, the signal processing circuit 4, and the DRAM 5. A recording instruction is applied to the processing circuit 6 in the step S23, thereby recording the compressed image signal based on the primary exposure into the flash memory 8.

Figure 3:
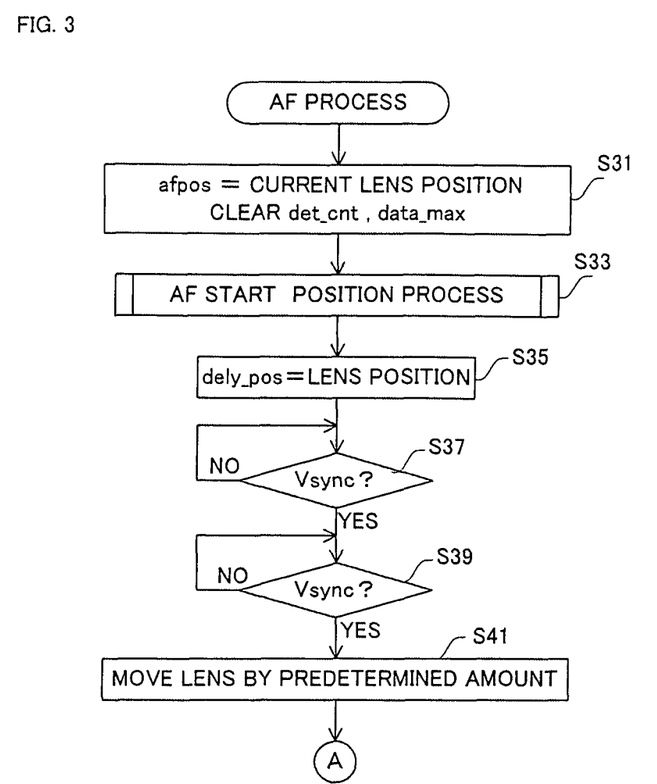
FIG. 3 is a flowchart showing another portion of the operation of the FIG. 1 embodiment.
Figure 4:
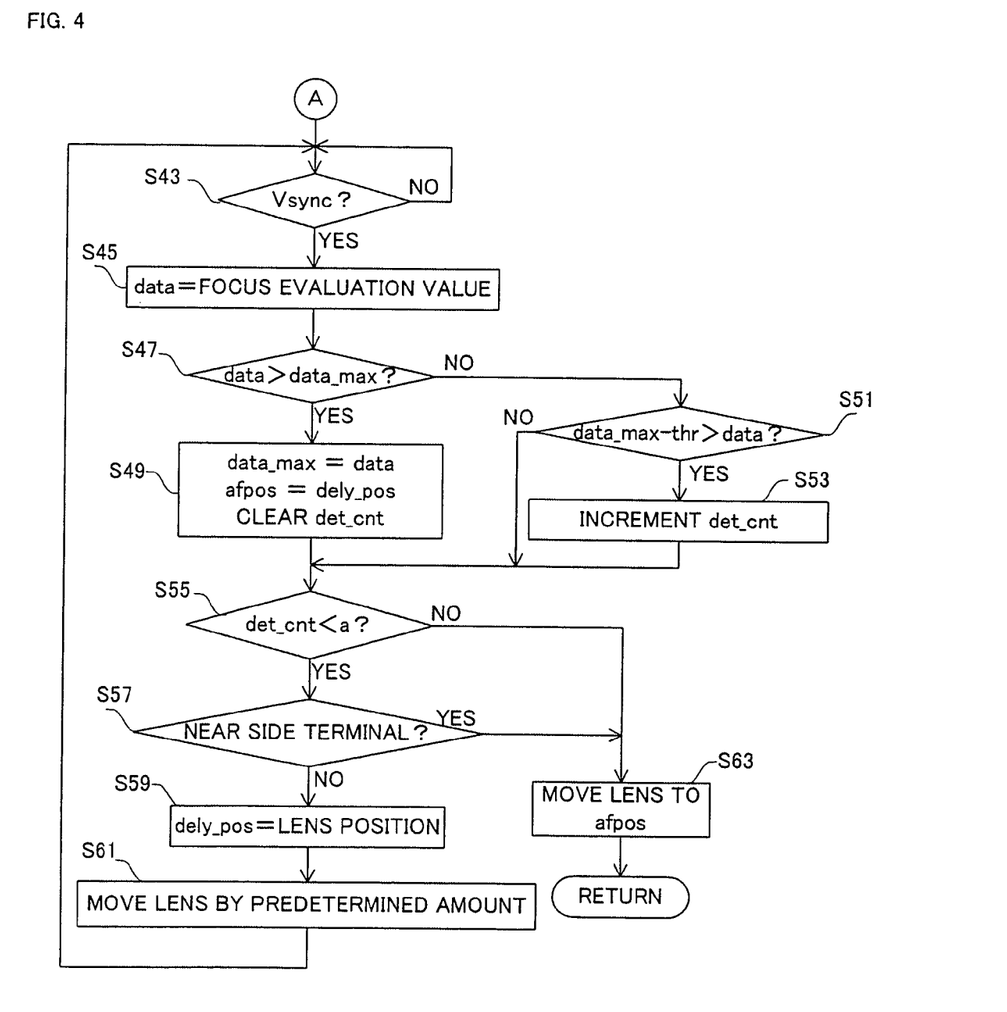
FIG. 4 is a flowchart showing still another portion of the operation of the FIG. 1 embodiment.

The AF control shown in the step S13 follows a subroutine shown in FIG. 3 and FIG. 4. Firstly, in a step S31, current position information of the focus lens 1 is set as a variable afpos and a variable det_cnt and a variable data_max are cleared. It is noted that the position information of the focus lens 1 is expressed by the number of driving steps of the focus motor 14. A role of the variable det_ent and the variable data_max is later described.

In a step S33, by an AF start position process described later, a moving start position of the focus lens 1 is settled, and the focus lens 1 is set to the settled moving start position. In a succeeding step S35, the current position information of the focus lens 1 is set as an initial value of a variable dely_pos. The variable dely_pos is a variable provided in order to retain a corresponding relationship between a position of the focus lens 1 that moves by each predetermined step and the focus evaluation value in view of a fact that there is a difference between the field in which the imaging device 2 is exposed and the field in which the focus evaluation value is calculated on the basis of the exposure. That is, as shown in FIG. 6, the variable dely_pos is a variable not showing the current lens position but a variable showing the lens position at a time that the raw image signal, which is a basis of the focus evaluation value, is generated.

Figure 6:
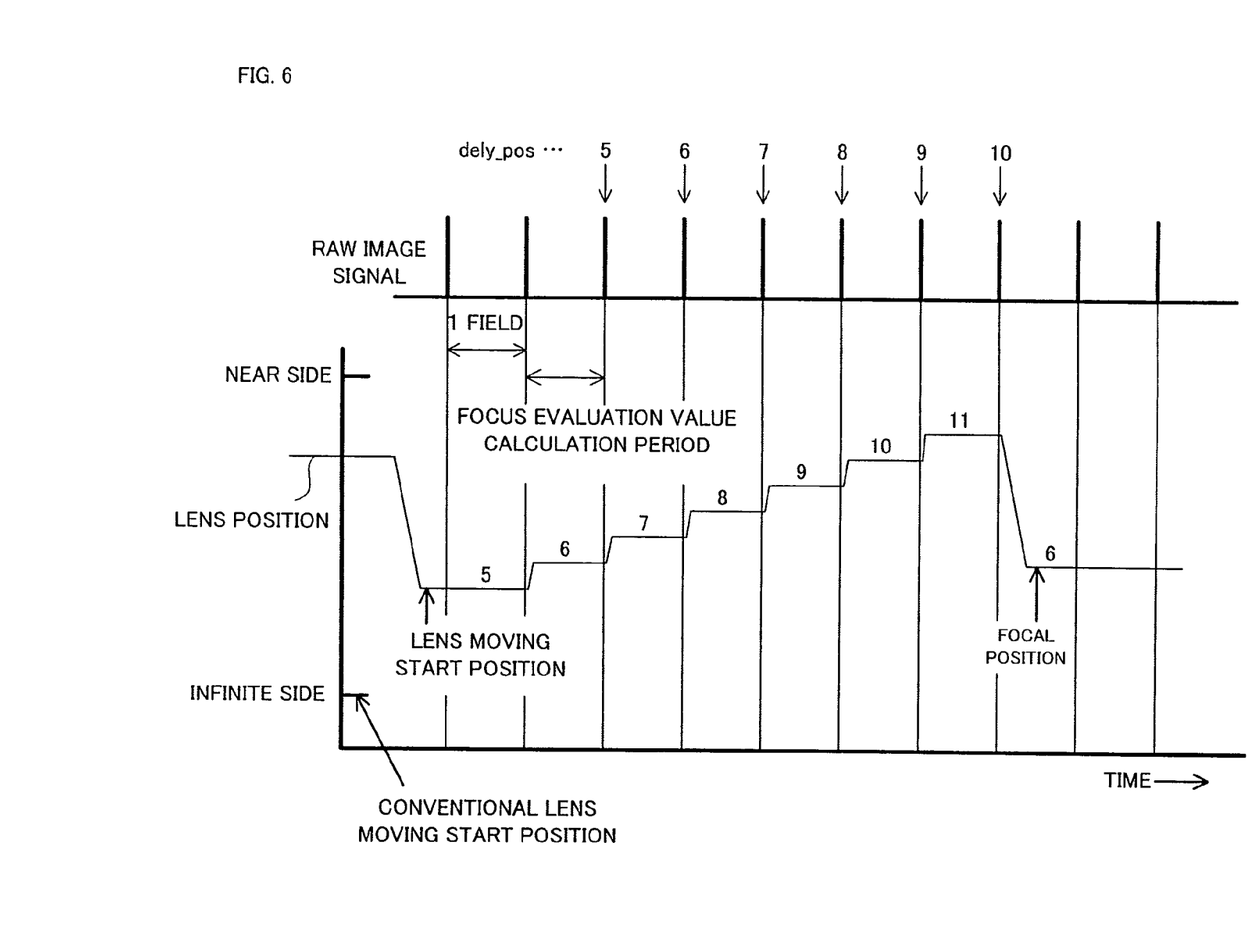
FIG. 6 is an illustrative view showing one portion of the operation of the FIG. 1 embodiment.

It is noted that FIG. 6 indicates a situation in which the focus lens 1 moves from a lens position 5 to a lens position 11, and thereafter, is set to a lens position 6, which is the focal position. In addition, numerals "5"-"10" indicating the variable dely_pos are assigned to the focus evaluation values on the basis of the raw image signals generated 2 fields before.

It is determined whether or not the vertical synchronization signal is generated in steps of S37 and S39, and if the vertical synchronization signal is generated twice, the process advances to a step S41. In the step S41, the focus lens 1 is moved toward a near-side terminal by a predetermined amount. The predetermined amount is an amount equivalent to several steps of the focus motor 13.

In a step S43, it is determined once again whether or not the vertical synchronization signal is generated, and if YES is determined, the process advances to a step S45 so as to update the variable data by the focus evaluation value being outputted from the digital integrator 12 at this time. The updated variable data is compared with the variable data_max in a step S47. If data is larger than (>) data_max, the process advances to a step S49, and if data is equal to or less than (≦) data_max, the process advances to a step S51.

In the step S49, the variable data is set as the variable data_max, the variable dely_pos is set as the variable afpos, and the variable det_cnt is cleared. On the other hand, in the step S51, a subtracted value data_max-thr that subtracts a predetermined value thr from the variable data_max is compared with the variable data. Then, if data_max-thr is equal to or less than (≦) data, the process directly advances to a step S55. However, if data_max-thr is larger than (>) data, the variable det_cnt is incremented before advancing to the step S55.

The variable det_cnt is compared with a predetermined value a in the step S55, and a current position of the focus lens 1 is determined in a step S57. Then, if det_cnt is less than (<) a, and the lens position has not reached the near-side terminal, the variable dely_pos is updated by the current lens position information in a step S59, and the focus lens 1 is moved toward the near-side by the predetermined amount in a step S61 before returning to the step S43. This causes the processes of steps S57, S59, S43-S53 to be repeated as long as YES is determined in the step S55, and NO is determined in the step S57. On the other hand, if NO is determined in the step S55 or YES is determined in the step S57, the process advances to a step S63 so as to move the focus lens 1 to a position indicated by the variable afpos before ending the AF process.

This causes the focus lens 1 to gradually move from the moving start position, and the focus evaluation value outputted from the digital integrator 12 in each step is fetched by the CPU 13. If the fetched focus evaluation value is larger than a current maximum focus evaluation value, the lens position at a time that the raw image signal corresponding to the focus evaluation value is generated is temporarily determined as a focal position. That is, the temporarily determined focal position is updated at every time that a larger focus evaluation value is detected. If a situation in which the fetched focus evaluation value is smaller than the current maximum focus evaluation value in a predetermined range continues for predetermined times, the focal position is defined, and the focus lens 1 is moved to the defined focal position. It is noted that in defining the focal position, a hill-climbing control may be performed in the vicinity of the lens position at which the maximum focus evaluation value is obtained.

Figure 5:
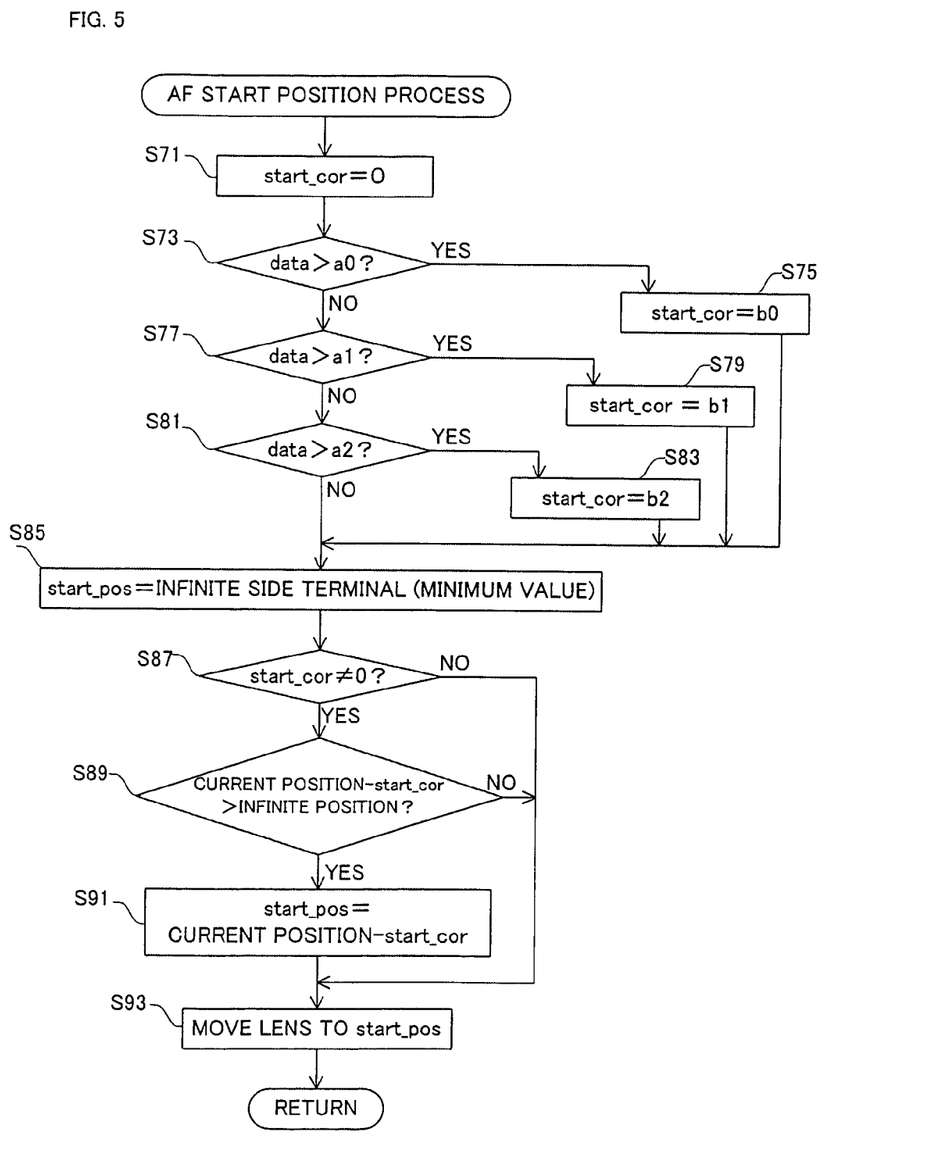
FIG. 5 is a flowchart showing yet still another portion of the operation of the FIG. 1 embodiment.

The AF start position process shown in the step S33 follows a flowchart shown in FIG. 5. Firstly, a variable start_cor used for calculating the moving start position is set to "0" in a step S71. In steps S73, S77, and S81, the variable data obtained in the process of the immediately preceding step S9 (shown in FIG. 2) is compared with threshold values a0, a1, and a2 in order to determine the focal level. If data is larger than (>) a0, the variable start_cor is set to a predetermined value b0 in a step S75, if data is larger than (>) a1, the variable start_cor is set to a predetermined value b1 in a step S79, and if data is larger than (>) a2, the variable start_cor is set to a predetermined value b2 in a step S83.

There is established a relationship of a0 larger than (>) a1 larger than (>) a2 among the threshold values a0, a1, and a2, and there is established a relationship of b0 larger than (>) b1 larger than (>) b2 among the predetermined values b0, b1, and b2. Therefore, the larger the focus evaluation value immediately before starting the AF process, that is, the higher the focal level of the focus lens 1 immediately before starting the AF process, the smaller the value of the variable start_cor is set.

In a step S85, the variable start_pos showing the moving start position information is provisionally set to a value showing the infinite far side terminal of the object distance. The variable start_pos becomes a minimum at the infinite far side terminal, and a maximum at the near-side terminal. In a succeeding step S87, a value of the variable start_cor is determined, and if start_cor is not coincident with (≠) 0, a subtracted value that subtracts the variable start_cor from the value showing the current lens position is determined in a step S89. If the subtracted value is larger than the value indicating the infinite side terminal, the subtracted value is set as the variable start_pos in a step S91 before advancing to a step S93. On the other hand, if NO is determined in the step S87 or S89, the process directly proceeds to the step S93. The focus lens 1 is moved to a position that the variable start_pos indicates in the step S93, and upon completion thereof, the AF start position process is ended.

Therefore, if the variable start_cor is 0 or the subtracted value (=current position information−start_cor) is equal to or less than the value showing the infinite side terminal, the infinite side terminal becomes the moving start position. In contrary thereto, if the variable start_cor shows the predetermined value b0, b1 or b2, and the subtracted value is larger than the value showing the infinite side terminal, a position that the subtracted value shows is rendered the moving start position. Therefore, the higher the focal level immediately before starting the AF process, the closer the focus lens 1 is set to the near-side.

Referring to FIGS. 7-11, an electronic still camera of another embodiment is almost the same as the electronic still camera shown in FIGS. 1-6 so that duplicated descriptions regarding the same portions are omitted as much as possible.

Figure 7:
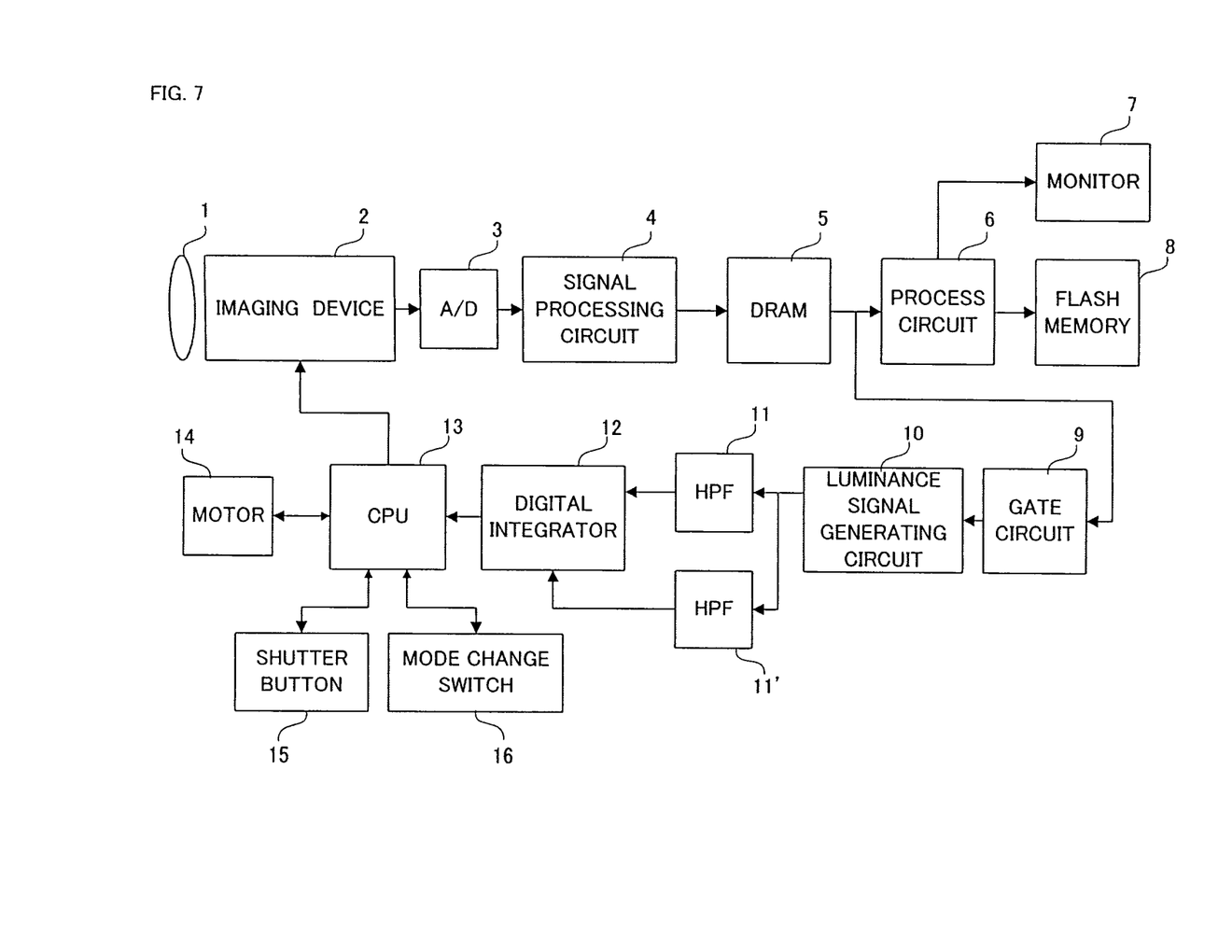
FIG. 7 is a block diagram showing another embodiment of the present invention.

The luminance signal outputted from the luminance signal generating circuit 10 is, in addition to the HPF11, applied to an HPF 11'. A cut-off frequency of the HPF 11' is lower than a cut-off frequency of the HPF 11. Therefore, a pass-band width of the HPF 11' is wider than the pass-band width of the HPF 11, and HPF 11' passes a frequency component lower than the HPF 11 through. It is noted that a high-frequency component extracted by the HPF 11 is defined as a first high-frequency component, and a high-frequency component extracted by the HPF 11' is defined as a second high-frequency component.

The first high-frequency component and the second high-frequency component are separately integrated by the digital integrator 12. The integration is performed by each 1 field similar to the above-described embodiment, thereby evaluating the focus evaluation value of each field. The focus evaluation value obtained by integrating the first high-frequency component is defined as a first focus evaluation value, and the focus evaluation value obtained by integrating the second high-frequency component is defined as a second focus evaluation value.

Figure 10:
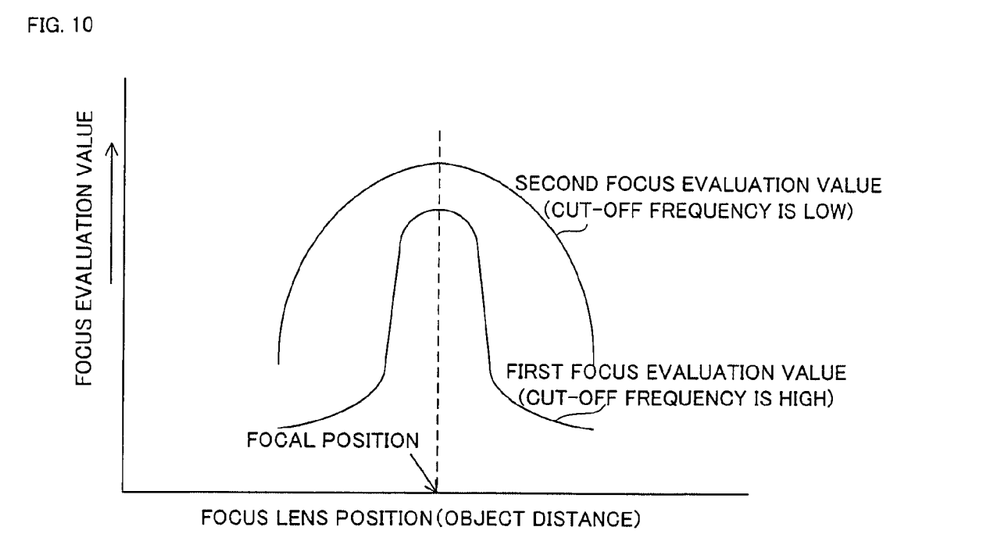
FIG. 10 is a graph showing a relationship between a lens position and a focus evaluation value.
Figure 11:
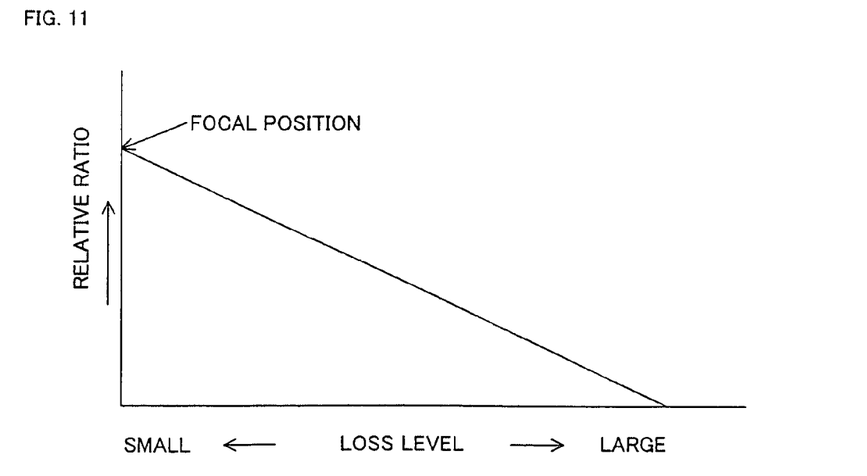
FIG. 11 is a graph showing a relationship between a loss level and a relative ratio.

The first focus evaluation value and the second focus evaluation value change as shown in FIG. 10 in accordance with a position of the focus lens 1. Either the first focus evaluation value or the second focus evaluation value becomes a maximum at a focal position, however, the cut-off frequency of the HPF 11' is lower than the cut-off frequency of the HPF 11 so that the second focus evaluation value changes more gently than the first focus evaluation value.

Figure 8:
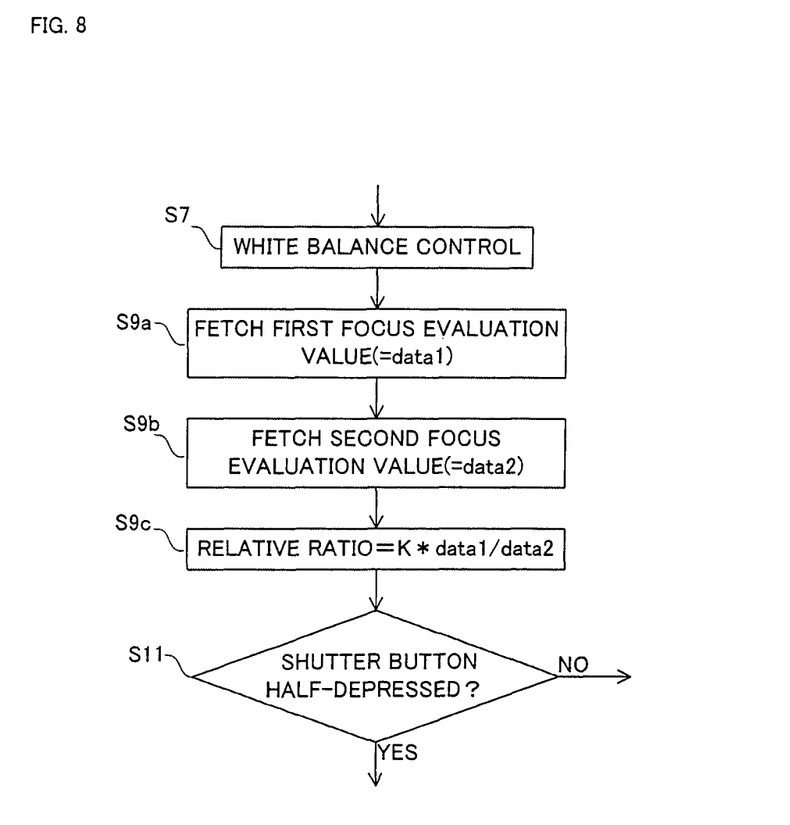
FIG. 8 is a flowchart showing one portion of an operation of the FIG. 7 embodiment.
Figure 9:
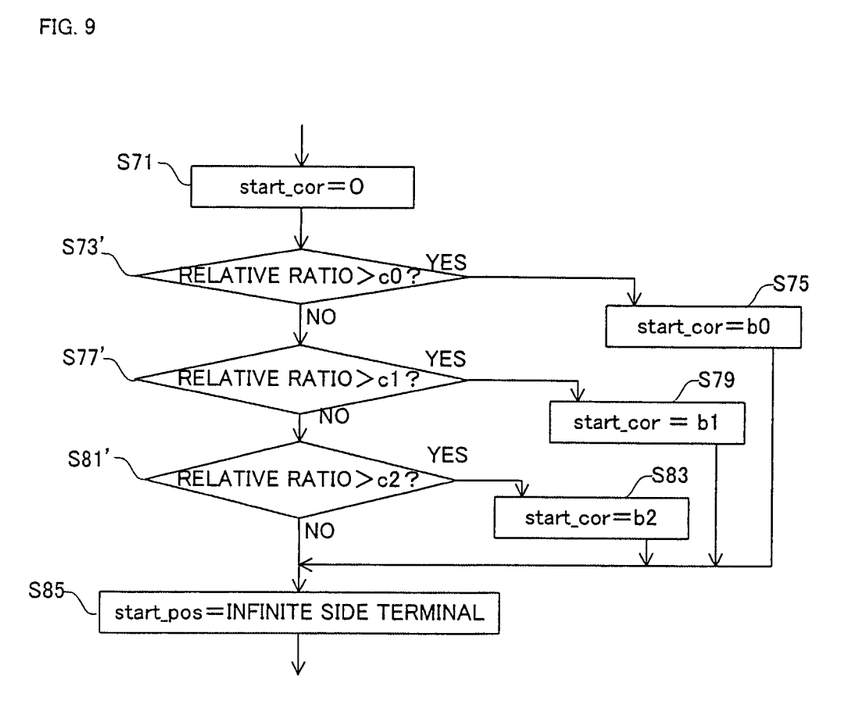
FIG. 9 is a flowchart showing another portion of the operation of the FIG. 7 embodiment.

The CPU 13 executes steps S9a-S9c shown in FIG. 8 in place of the step S9 shown in FIG. 2, and executes steps S73', S75', S77' shown in FIG. 9 in place of the steps S73, S77, S79 shown in FIG. 5.

Firstly, referring to FIG. 8, upon completion of the color balance control in the step S7, the first focus evaluation value and the second focus evaluation value are fetched from the digital integrator 12 in the steps S9a and S9b. The first focus evaluation value is retained as a variable data1, and the second focus evaluation value is retained as a data2. A relative ratio is calculated according to Equation (1) in the step S9c, and if the relative ratio is evaluated, the process advances to the step S11.

$$\text{Relative ratio} = K * \text{data1}/\text{data2} \quad (1)$$

K: constant

Referring to FIG. 9, the variable start_cor is set to "0" in the step S71 before comparing the relative ratio with threshold values C0, C1, and C2 in steps S73', S77', and S79'. If the relative ratio is larger than (>) C0, the process proceeds to the step S75. If the relative ratio is larger than (>) C1, the process proceeds to the step S79. If the relative ratio is larger than (>) C2, the process proceeds to the step S81. If neither condition is satisfied, the process proceeds to the step S85. It is noted that there is established a relationship of C0 larger than (>) C1 larger than (>) C2 among the threshold values C0, C1, and C2.

The first focus evaluation value and the second focus evaluation value become a maximum at a focal position, however, a specific numerical value (maximum value) changes in accordance with a situation of the object. In contrary thereto, the relative ratio expressed by a ratio is not to greatly change in accordance with the situation of the object. If an illumination of the object changes, for example, the first focus evaluation value and the second focus evaluation value greatly change, however, a change amount of the relative ratio is small. Accordingly, a relationship between the relative ratio and a loss level (deviation amount from the focal position) having a characteristic shown in FIG. 10 with respect to any object. That is, the relative ratio shows monotony reducing characteristic in relation to the loss level. This makes it possible to appropriately determine the focal level irrespective of the situation of the object.

Figure 12:
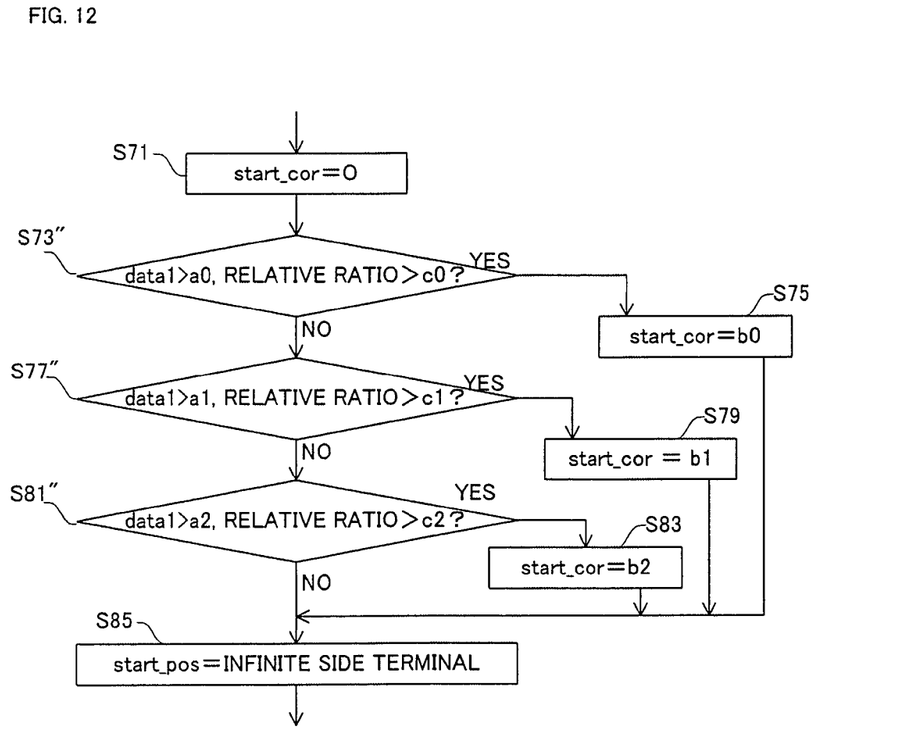
FIG. 12 is a flowchart showing one portion of an operation of another embodiment of the present invention.

An electronic still camera in another embodiment is similar to the electronic still camera shown in FIG. 7-FIG. 11 except that steps of S79", S77", and S81" shown in FIG. 12 are executed in place of the steps of S73, S77, and S79 shown in FIG. 5 so that duplicated descriptions regarding similar portions are omitted.

It is determined whether or not data1 is larger than (>) a0 and the relative ratio is larger than (>) c0 in the step S73", it is determined whether or not data1 is larger than (>) a1 and the relative ratio is larger than (>) c1 in the step S77", and it is determined whether or not data1 is larger than (>) a2 and the relative ratio is larger than (>) c2 in the step S81". Then, if YES is determined in the step S73", the process proceeds to the step S75, if YES is determined in the step S77", the process proceeds to the step S79, if YES is determined in the step S81", the process proceeds to the step S83, and if NO is determined in the step S81", the process proceeds to the step S85. It is noted that the threshold values a0, a1, and a2 in this embodiment are identical to the threshold values a0, a1, and a2 used in the steps S73, S77, and S81 shown in FIG. 5.

In this embodiment, both the first focus evaluation value and the relative ratio are used for determining the focal level, thus possible to appropriately determine the moving start position of the focus lens.

It is noted that in the above embodiments, the focus lens is to be moved in the optical axis direction. However, the imaging device may be moved in the optical axis direction in place of the focus lens or in addition to the focus lens. Furthermore, an imaging device of a CCD type or a CMOS type may be used as an imaging device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera that adjusts a distance from a focus lens to a photoelectronic imaging device, comprising:

a determiner which determines a focal level on the basis of an image signal outputted from said photoelectronic imaging device when a distance adjusting instruction is applied, the determiner further using the determined focal level to determine an initial position of the focus lens;

a settler which settles an initial value of said distance on the basis of a determination result of said determiner by moving one of the focus lens and the photoelectronic imaging device in a first direction;

a changer which gradually changes in a series of steps said distance toward an optimum value using said initial value settled by said settler as a reference by moving said one of the focus lens and the photoelectronic device in a second direction, the second direction being opposite to the first direction; and an optimum value setter which sets said distance to said optimum value on the basis of the image signal outputted from said photoelectronic imaging device in each step changed by said changer.

2. A focus control method of an electronic camera that adjusts a distance from a focus lens to a photoelectronic imaging device, comprising steps of:

(a) determining a focal level on the basis of an image signal outputted from said photoelectronic imaging device when a distance adjusting instruction is applied, and further using the determined focal level to determine an initial position of the focus lens;

(b) settling an initial value of said distance on the basis of a determination result obtained in said step (a) by moving one of the focus lens and the photoelectronic imaging device in a first direction;

(c) gradually changing in a series of steps said distance toward an optimum value using said initial value settled by said step (b) as a reference by moving said one of the focus lens and the photoelectronic device in a second direction, the second direction being opposite to the first direction; and (d) setting said distance to said optimum value on the basis of the image signal outputted from said photoelectronic imaging device in each step changed by said step (c).

3. An electronic camera in which a focus evaluating value is detected based on a level of a high-frequency component of an image signal obtained from an imaging device, and a focusing operation is performed according to the focus evaluating value in which a distance from a focus lens to the imaging device is adjusted, comprising:

a determiner which determines a focal level on the basis of an image signal outputted from said imaging device when a distance adjusting instruction is applied, the determiner further using the determined focal level to determine an initial position of the focus lens;

a detector which detects a first focus evaluating value based on a level of the high-frequency component of the image signal at a timing that a focus adjusting instruction is applied;

a mover which moves at least one of a focus lens and said imaging device in a first direction such that a relative position between said focus lens and said imaging device becomes an initial position that is determined by said first focus evaluating value detected by said detector;

a searcher which moves step by step said at least one of said focus lens and said imaging device in a second direction converse to said first direction from said initial position so as to obtain a second, converse direction focus evaluating value for each step based on a level of the high-frequency component of the image signal; and a focuser which moves said at least one of said focus lens and said imaging device to a focus position in accordance with a relationship between a position of said at least one of said focus lens and said imaging device that is set step by step by said searcher and said second, converse direction focus evaluating value for each step obtained from movement of said at least one of said focus lens and said imaging device in said converse direction.

4. A focus control method of an electronic camera, in which a focus evaluating value is detected based on a level of a high-frequency component of an image signal obtained from an imaging device, and a focusing operation is performed according to the focus evaluating value in which a distance from a focus lens to the imaging device is adjusted, comprising steps of:

(a) determining a focal level on the basis of an image signal outputted from said imaging device when a distance adjusting instruction is applied, and further using the determined focal level to determine an initial position of the focus lens;

(b) detecting a first focus evaluating value based on a level of the high frequency component of the image signal at a timing that a focus adjusting instruction is applied;

(c) moving at least one of a focus lens and said imaging device in a first direction such that a relative position between said focus lens and said imaging device becomes an initial position that is determined by said step (b);

(d) moving step by step said at least one of said focus lens and said imaging device in a second direction converse to said first direction from said initial position so as to obtain a second, converse direction focus evaluating value for each step based on a level of the high-frequency component of the image signal; and (e) moving said at least one of said focus lens and said imaging device to a focus position in accordance with a relationship between a position of said at least one of said focus lens and said imaging device that is set step by step by said step (d) and said second, converse direction focus evaluating value for each step obtained from movement of said at least one of said focus lens and said imaging device in said converse direction.

* * * * *